US012803868B2

(12) United States Patent
Darwish et al.

(10) Patent No.: US 12,803,868 B2
(45) Date of Patent: Nov. 17, 2026

(54) MOBILE NETWORK FAILURE PREVENTION AND RECOVERY

(71) Applicants: RAKUTEN MOBILE, INC., Tokyo (JP); RAKUTEN SYMPHONY, INC., Tokyo (JP)

(72) Inventors: Ahmed Bahaaeldin Darwish, Tokyo (JP); Kushal Suresh Dabbe, Tokyo (JP)

(73) Assignees: Rakuten Mobile, Inc., Tokyo (JP); RAKUTEN SYMPHONY, INC., Tokyo (JP)

( * ) Notice: Subject to any disclaimer, the term of this patent is extended or adjusted under 35 U.S.C. 154(b) by 78 days.

(21) Appl. No.: 19/058,745

(22) Filed: Feb. 20, 2025

(65) Prior Publication Data

US 2026/0246689 A1 Aug. 20, 2026

(51) Int. Cl.

| | |
|---|---|
| ***H04L 41/0663*** | (2022.01) |
| ***H04L 41/147*** | (2022.01) |
| ***H04L 41/16*** | (2022.01) |
| *H04W 24/04* | (2009.01) |

(52) U.S. Cl.

CPC ........ *H04L 41/0663* (2013.01); *H04L 41/147* (2013.01); *H04L 41/16* (2013.01); *H04W 24/04* (2013.01)

(58) Field of Classification Search

CPC ... H04L 41/0663; H04L 41/147; H04L 41/16; H04W 24/04

See application file for complete search history.

(56) References Cited

U.S. PATENT DOCUMENTS

2007/0190996 A1* 8/2007 Asthana ................ H04W 24/04 455/423
2011/0170422 A1* 7/2011 Hu .................. H04W 36/00692 370/242
2022/0167185 A1* 5/2022 Kim ...................... H04W 24/04

* cited by examiner

*Primary Examiner* — Barbara B Anyan

(74) *Attorney, Agent, or Firm* — Sughrue Mion, PLLC

(57) ABSTRACT

Provided are systems, method, and device for automatically performing network failure prevention and recovery. According to example embodiments, the system may be configured to: predict, by a first agent, a network failure; perform, by the first agent, edge level configuration management for a base station based on the predicted network failure; perform, by a second agent, cluster level configuration management for a group of base stations based on a result of edge level configuration management; and perform, by a third agent, global level configuration management for all base stations within a network based on a result of cluster level configuration management.

20 Claims, 7 Drawing Sheets

MOBILE NETWORK FAILURE PREVENTION AND RECOVERY

FIELD

The present disclosure relate to failure prevention and recovery in a mobile telecommunications network.

BACKGROUND

The information disclosed in this background section is only for enhancement of understanding of the general background of the disclosure and should not be taken as an acknowledgement or any form of suggestion that this information forms the prior art already known to a person skilled in the art.

Network failure prevention and recovery is an important field in telecommunications networks. As the network expands to cover larger areas and increases in complexity to provide a wider range of services, it becomes more susceptible to failures that can lead to reduced performance and network outages.

Failures can be caused by a wide range of factors, from unexpected spikes in traffic to environmental impact on network infrastructures. As such, it is important to develop comprehensive and robust failure prevention and recovery techniques to appropriately reduce the impact of failures on the network.

SUMMARY

Example embodiments of the present disclosure automatically perform network failure prevention and recovery. As such, example embodiments of the present disclosure allow for reduction of impacts from network failure through preemptive coordinated response from agents at different levels within the network, and thereby preventing service interruptions and maintaining high and seamless service quality in light of the network failure.

According to example embodiments, a system is provided. The system may be configured to: predict, by a first agent, a network failure; perform, by the first agent, edge level configuration management for a base station based on the predicted network failure; perform, by a second agent, cluster level configuration management for a group of base stations based on a result of edge level configuration management; and perform, by a third agent, global level configuration management for all base stations within a network based on a result of cluster level configuration management.

According to example embodiments, a method is provided. The method may include: predicting, by a first agent, a network failure; performing, by the first agent, edge level configuration management for a base station based on the predicted network failure; performing, by a second agent, cluster level configuration management for a group of base stations based on a result of edge level configuration management; and performing, by a third agent, global level configuration management for all base stations within a network based on a result of cluster level configuration management.

According to example embodiments, a non-transitory computer-readable recording medium is provided. The non-transitory computer-readable recording medium may have recorded thereon instructions executable by a system to cause the system to perform a method including: predicting, by a first agent, a network failure; performing, by the first agent, edge level configuration management for a base station based on the predicted network failure; performing, by a second agent, cluster level configuration management for a group of base stations based on a result of edge level configuration management; and performing, by a third agent, global level configuration management for all base stations within a network based on a result of cluster level configuration management.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects, and advantages of embodiments of the disclosure will be described below with reference to the accompanying drawings, in which like reference numerals denote like elements, and wherein.

DETAILED DESCRIPTION

Figure 1:
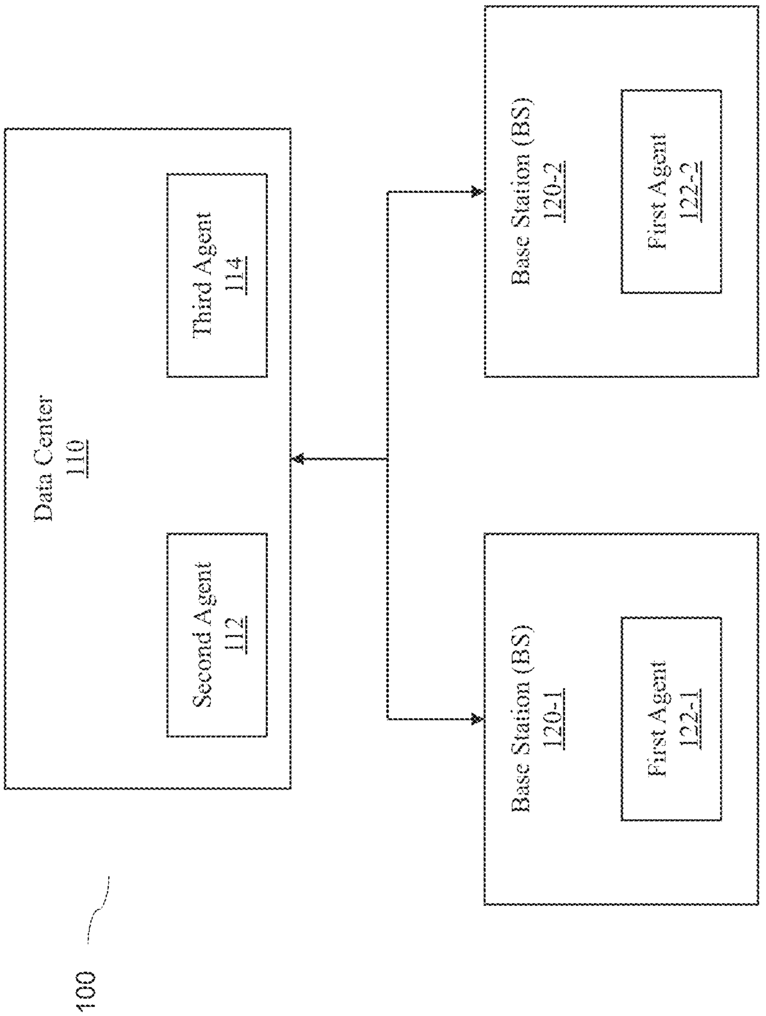
FIG. 1 illustrates an example system architecture, according to one or more example embodiments.

The following detailed description of example embodiments refers to the accompanying drawings. The present disclosure provides illustrations and descriptions, but is not intended to be exhaustive or to limit the implementations to the precise form disclosed. Modifications and variations are possible in light of the present disclosure or may be acquired from practice of the implementations. Further, one or more features or components of one embodiment may be incorporated into or combined with another embodiment (or one or more features of another embodiment). Additionally, the flowchart and description of operations provided below relate to at least one of the embodiments in the present disclosure. It should be noted that it is possible to make other embodiments that do not exactly match the flowchart and its description. It is understood that in other embodiments one or more operations may be omitted, one or more operations may be added, one or more operations may be performed simultaneously (at least in part). Further, the order of one or more operations may be switched, as long as these modifications may not affect the resulting scope of the present disclosure.

It will be apparent that systems and/or methods, described herein, may be implemented in different forms of hardware, software, or a combination of hardware and software. The actual specialized control hardware or software code used to implement these systems and/or methods should not limit their implementations. Thus, the operation and behavior of the systems and/or methods are described herein without reference to specific software code. It is understood that software and hardware may be designed to implement the systems and/or methods based on the description herein.

Even though particular combinations of features are recited in the claims and/or disclosed in the specification, the particular combinations are not intended to limit the disclosure of implementations. In fact, many of these features may be combined in ways not specifically recited in the claims and/or disclosed in the specification. Even if a dependent claim directly depends on only one claim, the present disclosure may indicate that the dependent claim is dependent on other claims in the claim set.

No element, act, or instruction used herein should be construed as critical or essential unless explicitly described as such. Also, as used herein, the articles "a" and "an" (in other words, nouns not mentioned in the plural) are intended to include one or more items, and may be used interchangeably with "one or more." Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]," "[A] and/or [B]," or "at least one of [A] or [B]" are to be understood as including only A, only B, or both A and B. Further still, where only one item is intended, the term "one" or similar language is used.

Expressions such as "at least one processor," where configured to implement a plurality of operations, execute a plurality of instructions, etc., are to be understood as a single processor implementing the plurality of operations, etc., or each of plural processors implementing at least some (but not necessarily all) of the plurality of operations, etc.

Reference throughout this specification to "one embodiment," "an embodiment," "non-limiting exemplary embodiment," or similar language means that a particular feature, structure, or characteristic described in connection with the indicated embodiment is included in at least one embodiment of the present solution. Thus, the phrases "in one embodiment", "in an embodiment," "in one non-limiting exemplary embodiment," and similar language throughout this specification may, but do not necessarily, all refer to the same embodiment.

Further, the described features, advantages, and characteristics of the present disclosure may be combined in any suitable manner in one or more example embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

The foregoing disclosure provides illustration and description but is not intended to be exhaustive or to limit the implementations to the precise form disclosed. Modifications and variations are possible in light of the above disclosure or may be acquired from practice of the implementations.

It shall be noted that, descriptions of example embodiments of the present disclosure may include terms and names defined in one or more standard organizations, such as the 3rd Generation Partnership Project (3GPP) standard organization, the European Telecommunications Standards Institute (ETSI) standard organization, the Open Radio Access Network (O-RAN) Alliance standard organization, and the like.

Further, example embodiments of the present disclosure may apply to any suitable network elements in any suitable telecommunications system, such as a 4G LTE system, a 5G system, a 6G system, and the like, without departing from the scope of the present disclosure. Similarly, example embodiments of the present disclosure may be implemented in accordance with any standard, such as standards related to 3rd Generation Partnership Project (3GPP) standard organization, Open Radio Access Network (O-RAN) Alliance standard organization, TeleManagement Forum (TMF) standard organization, Cloud Native Computing Foundation (CNCF) standard organization, European Telecommunications Standards Institute (ETSI) standard organization, and the like, without departing from the scope of the present disclosure.

As described above, network failure prevention and recovery is an important field in telecommunications networks that aims to reduce the impact of failures on the network.

In the related art, several methods and techniques have been proposed for network failure prevention and recovery. However, such methods and techniques may be reactive, where operations to reduce impact of failures on the network are performed after the failures have already occurred. Further, such methods and techniques may also be narrow in scope, where operations to reduce impact of failures on the network are performed at a specific individual cell level without coordination or consideration on a bigger picture of the network as a whole.

For example, in a first scenario where a cell in a shopping mall (cell A) fails, the neighboring cells may make independent decisions to adjust their own parameters (e.g., increase power) only in response to cell A's failures where users may have already started experiencing service drops leading to a significant period of time with degraded service.

In a second scenario where poor weather causes signal degradation, cells may detect the signal degradation after it has already occurred individually, and perform their own parameter adjustments individually without any environmental context. Such incoordination may lead to interference and coverage holes.

In a third scenario where an event (e.g., sports game event) is being performed causing a sudden spike in traffic, cells in the local area may perform load balancing only after the traffic spike and service congestion have already occurred leading to a significant period of time with degraded service during peak events. Further, the load balancing may be performed at a local level and limited to simple individual parameter adjustments, which may lead to ping-pong effects between cells.

In a fourth scenario where an event (e.g., construction) is being performed causing cell coverage blockage, unmanned aerial vehicles (UAVs) may be deployed to accommodate for the cell coverage blockage. However, the use of UAVs may be subjected to various limitations, such as high operational costs, weather dependencies, limited flight times, and the like.

In a fifth scenario where users are riding on a train traversing through multiple cells at a high speed, handovers may be performed at basic cell (edge) levels where the individual cells may not be able to predict and prepare for incoming demands leading to connection drops between cells.

Accordingly, system, methods, devices, and the like, provided in the example embodiments of the present disclosure automatically perform network failure prevention and recovery.

According to example embodiments, a network failure may first be predicted by a first agent. Subsequently, the first agent may perform edge level configuration management for a base station based on the predicted network failure. In response, a second agent may perform cluster level configuration management for a group of base stations based on a result of edge level configuration management, and then a third agent may perform global level configuration management for all base stations within a network based on a result of cluster level configuration management.

Ultimately, example embodiments of the present disclosure automatically perform network failure prevention and recovery, which allow for reduction of impacts from network failure through preemptive coordinated response from agents at different levels within the network, and thereby preventing service interruptions and maintaining high and seamless service quality in light of the network failure.

It is contemplated that features, advantages, and significances of example embodiments described hereinabove are merely a portion of the present disclosure, and are not intended to be exhaustive or to limit the scope of the present disclosure.

Further descriptions of the features, components, configuration, operations, and implementations of the system of the present disclosure, according to one or more embodiments, are provided in the following.

Example System Architecture

FIG. 1 illustrates an example system architecture, according to one or more example embodiments. As illustrated in FIG. 1, the system architecture may include at least one data center 110 and a plurality of base stations (BS) 120-1, 120-2. Each of the plurality of base stations may include a first agent, where base station 120-1 may include first agent 122-1 and base station 120-2 may include first agent 122-2, and the data center 110 may include a second agent 112 and a third agent 114.

It is contemplated that the system architecture may include more/fewer components than illustrated, and/or may be configured in a different manner, without departing from the scope of the present disclosure. For instance, in some implementations, the system architecture may include more than two base stations, more than one data center, more agents, and the like.

The plurality of base stations 120-1, 120-2 may include base stations in a network, such as a cell (e.g., super cell, a macro cell, a small cell, a femto cell, a pico cell, etc.), a node (e.g., a NodeB, an eNodeB (eNB), a gNodeB (gNB), etc.), a Radio Unit (RU) under radio access network (RAN), a carrier, a component carrier, a sector, and the like.

Further, each of the plurality of base stations may include and deploy a first agent, where base station 120-1 may include first agent 122-1 and base station 120-2 may include first agent 122-2. The first agent may include a software entity (e.g., software, program, application, etc.) deployed at a respective base station, and may be configured to perform edge level configuration management. Additionally, the first agent may be configured to perform network failure prediction.

According to example embodiments, the first agent may include a single entity configured to perform one or more operations of the edge level configuration management. According to example embodiments, the first agent may include a plurality of entities (plurality of first agents deployed in a single base station) that may be communicatively coupled to each other and that may be configured to perform one or more operations of the edge level configuration management. For example, base station 120-1 may include and deploy a single first agent 122-1 configured to perform a first operation of the edge level configuration management and a second operation of the edge level configuration management. In another example, base station 120-1 may include and deploy two first agents 122-1A, 122-1B, where first agent 122-1A may be configured to perform a first operation of the edge level configuration management while first agent 122-1B may be configured to perform a second operation of the edge level configuration management.

Additional descriptions associated with edge level configuration management and network failure prediction are described below with reference to FIG. 2 to FIG. 4.

The data center 110 may include data centers in a network, such as a server, a Distributed Unit (DU) under radio access network (RAN), a Central Unit (CU) under radio access network (RAN), and the like Further, data center 110 may include and deploy a second agent 112 and a third agent 114. The second agent may include a software entity (e.g., software, program, application, etc.) deployed at a data center, and may be configured to perform cluster level configuration management. The third agent may include a software entity (e.g., software, program, application, etc.) deployed at a data center, and may be configured to perform global level configuration management.

According to example embodiments, the second agent may include a single entity configured to perform one or more operations of the cluster level configuration management. According to example embodiments, the second agent may include a plurality of entities (plurality of second agents deployed in a single data center) that may be communicatively coupled to each other and that may be configured to perform one or more operations of the cluster level configuration management. For example, data center 110 may include and deploy a single second agent 112 configured to perform a first operation of the cluster level configuration management and a second operation of the cluster level configuration management. In another example, data center 110 may include and deploy two second agents 112A, 112B, where second agent 112A may be configured to perform a first operation of the cluster level configuration management while second agent 112B may be configured to perform a second operation of the cluster level configuration management.

Similarly, according to example embodiments, the third agent may include a single entity configured to perform one or more operations of the global level configuration management. According to example embodiments, the third agent may include a plurality of entities (plurality of third agents deployed in a single data center) that may be communicatively coupled to each other and that may be configured to perform one or more operations of the global level configuration management. For example, data center 110 may include and deploy a single third agent 114 configured to perform a first operation of the global level configuration management and a second operation of the global level configuration management. In another example, data center 110 may include and deploy two third agents 114A, 114B, where third agent 114A may be configured to perform a first operation of the global level configuration management while third agent 114B may be configured to perform a second operation of the global level configuration management.

Additional descriptions associated with cluster level configuration management and global level configuration management are described below with reference to FIG. 2 to FIG. 4.

According to example embodiments, each of the first agent, the second agent, and the third agent may include an artificial intelligence (AI) entity trained based on one or more machine learning methods. The one or more machine learning methods may include machine learning methods associated with reinforcement learning (RL), such as deep reinforcement learning (DRL), federated learning, meta learning, and the like. In particular, the DRL may facilitate real-time decisions, the federated learning may facilitate crowd pattern recognitions, and the meta learning may facilitate quick adaptations.

According to example embodiments, a feedback loop may be implemented to further train and update each of the first agent, the second agent, and the third agent. In particular, for example, one or more of the first agent, the second agent, and the third agent may perform the edge level configuration management, cluster level configuration management, and global level configuration management based on environmental information (which may be associated with one or more performance metrics). Once the edge level configuration management, cluster level configuration management, and/or global level configuration management are performed, actions taken by the first agent, the second agent, and/or the third agent and the associated results may be evaluated. Based on such evaluation, policies associated with RL and AI models of the first agent, the second agent, and/or the third agent may be updated to improve future decisions. The above described feedback loop may be a continuous process that improves the performance and decision making of the first agent, the second agent, and the third agent over time.

The data center 110 and the plurality of base stations 120-1, 120-2 may be communicatively coupled to each other, such that the first agents 122-1, 122-2, the second agent 112, and the third agent 114 may be communicatively coupled to each other.

Figure 2:
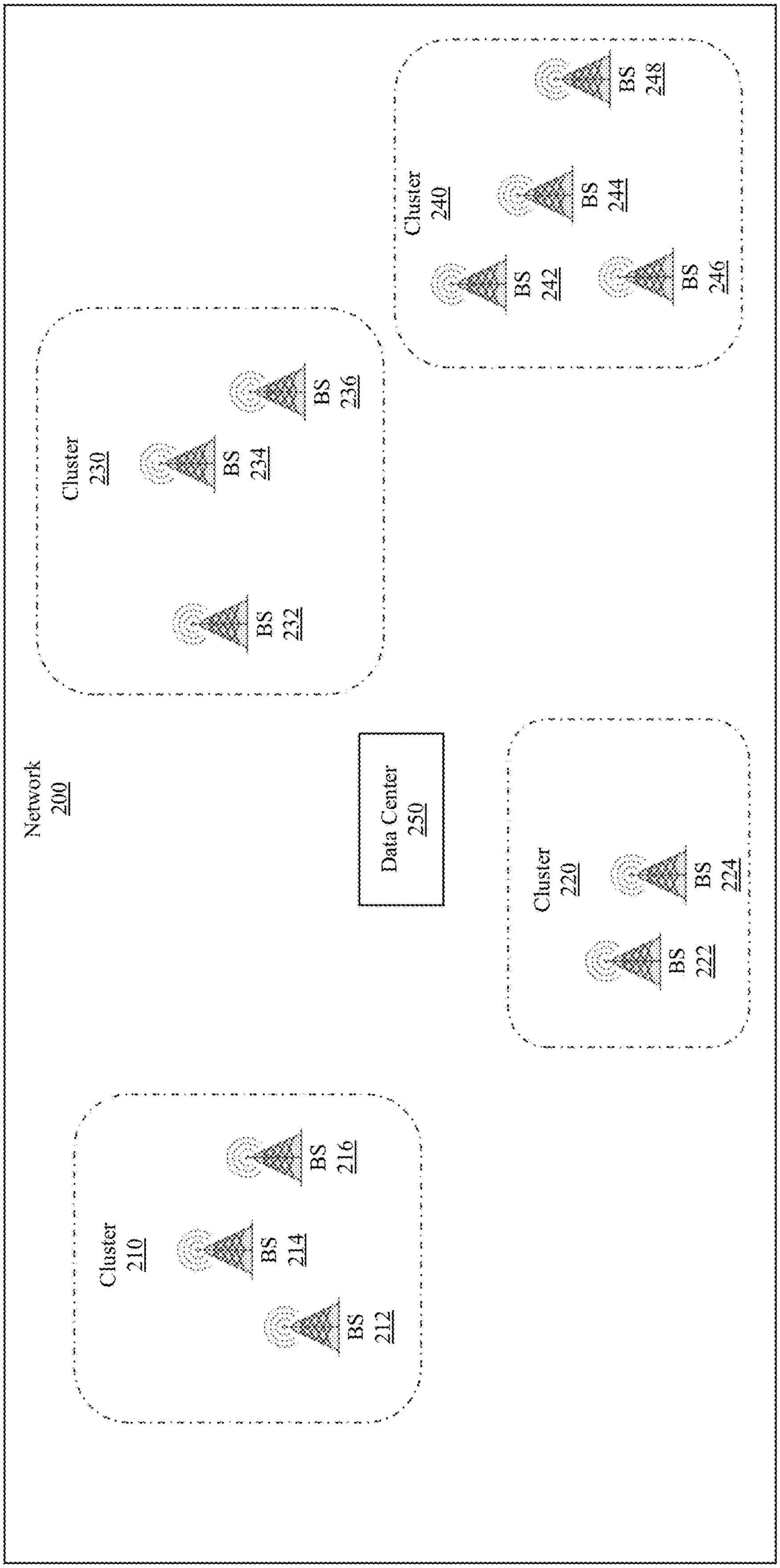
FIG. 2 illustrates an example network architecture, according to one or more example embodiments.

FIG. 2 illustrates an example network architecture, according to one or more example embodiments. As illustrated in FIG. 2, the network 200 may include a plurality of base stations (BS) 212, 214, 216, 222, 224, 232, 234, 236, 242, 244, 246, 248, and a data center 250. The plurality of base stations (BS) 212, 214, 216, 222, 224, 232, 234, 236, 242, 244, 246, and 248 may be grouped into clusters, where base stations 212, 214, 216 may be grouped into cluster 210, base stations 222, 224 may be grouped into cluster 220, base stations 232, 234, 236 may be grouped into cluster 230, and base stations 242, 244, 246, and 248 may be grouped into cluster 240.

It is understood that the configuration illustrated in FIG. 2 is simplified for descriptive purpose, and is not intended to limit the scope of the present disclosure in any way. Specifically, for example, the number of base stations can be any, the number of cluster can be any, the number of base stations in a single cluster can be any, and the like. Further, the basis for grouping the plurality of base stations into clusters can be any, such as geographical areas, and the like.

Here, the data center 250 may correspond to the data center 110 described above in relation to FIG. 1, and may include and deploy a second agent and a third agent (not shown). Similarly, the plurality of base stations (BS) 212, 214, 216, 222, 224, 232, 234, 236, 242, 244, 246, and 248 may correspond to the plurality of base stations 120-1, 120-2 described above in relation to FIG. 1, and may each include and deploy a first agent (not shown). As such, features associated with data center 110 and data center 250, as well as features associated with plurality of base stations 212, 214, 216, 222, 224, 232, 234, 236, 242, 244, 246, 248 and plurality of base stations 120-1, 120-2 may be similarly applicable to each other unless explicitly described otherwise.

In this regard, the first agent, second agent, and third agent may be configured to perform configuration management at various levels within the network. In particular, the first agent may be associated with an edge layer and may be configured to perform configuration management at an edge level, the second agent may be associated with a cluster layer and may be configured to perform configuration management at a cluster level, and the third agent may be associated with a global layer and may be configured to perform configuration management at a global level.

Figure 3A:
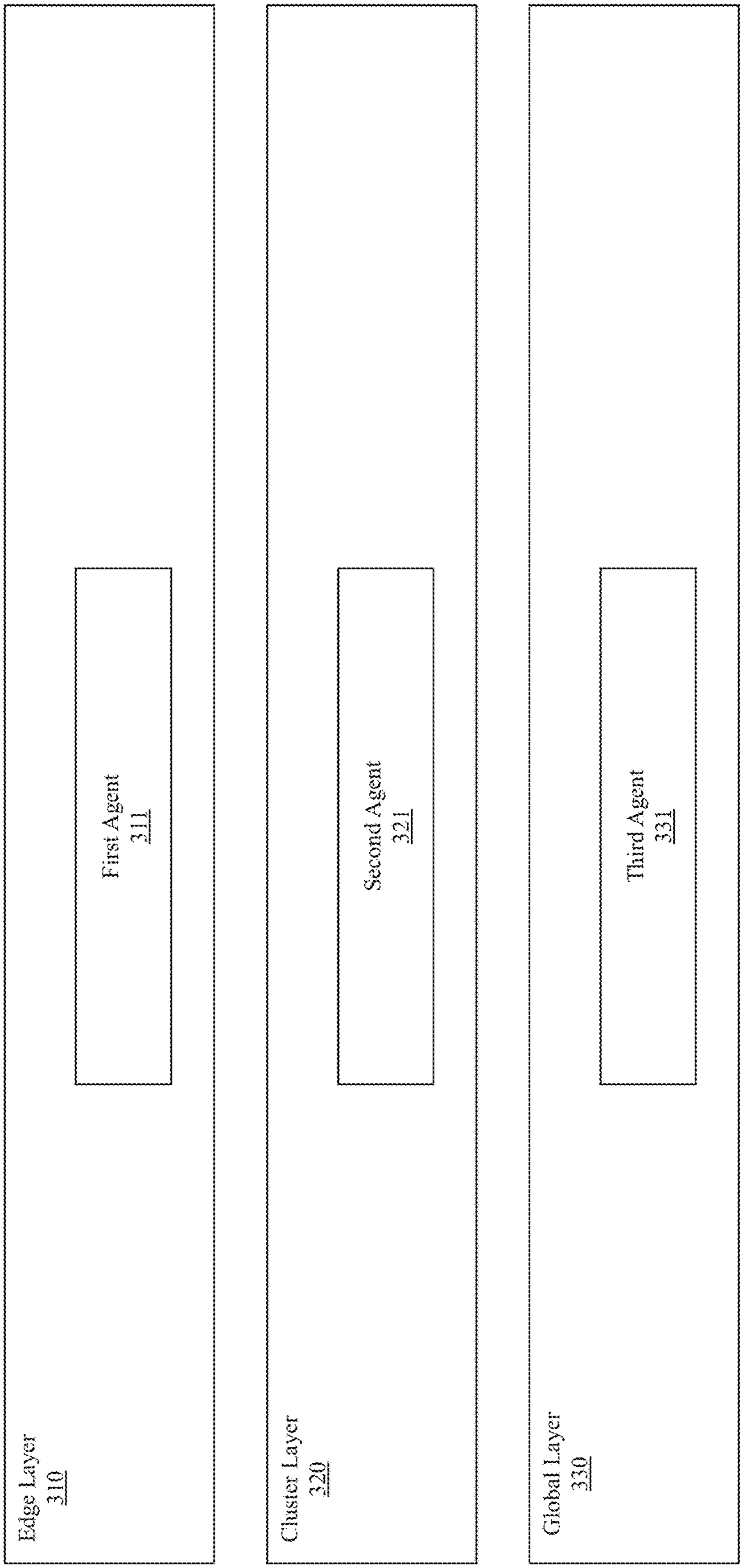
FIG. 3A to FIG. 3B illustrate example layer configurations, according to one or more example embodiments.

FIG. 3A illustrates an example layer configuration, according to one or more example embodiments. As illustrated in FIG. 3A, the first agent 311 may be associated with an edge layer 310 and may be configured to perform configuration management at an edge level, the second agent 321 may be associated with a cluster layer 320 and may be configured to perform configuration management at a cluster level, and the third agent 331 may be associated with a global layer 330 and may be configured to perform configuration management at a global level.

Here, the first agent 311, the second agent 321, and the third agent 331 may correspond to the first agent, the second agent, and the third agent described above in relation to FIG. 1 and FIG. 2. As such, features associated with agents in FIG. 3A and agents in FIG. 1 and FIG. 2 may be similarly applicable to each other unless explicitly described otherwise.

The edge level configuration management at the edge layer 310 may include an operation associated with a management of a configuration of individual base station (i.e., edge level). For example, one first agent deployed at base station 212 in FIG. 2 may perform an operation associated with a management of a configuration of base station 212, while another first agent deployed at base station 214 in FIG. 2 may perform an operation associated with a management of a configuration of base station 214.

According to example embodiments, the operation associated with a management of a configuration of individual base station (i.e., edge level configuration management) may include base station parameter adjustment. The base station parameter adjustments may include adjustments of parameters of a particular base station. The parameters of a particular base station may include any kind of parameters associated with a particular base station, such as antenna tilt, antenna array configuration, antenna power, and the like.

Here, the first agent may also be configured to perform network failure prediction. Network failure prediction may include operations associated with prediction of network failure of a particular base station. The network failure may include any kind of failure associated with a particular base station, such as high call drop rates, hardware/software malfunctions, and the like. Further, the network failure may be predicted based on environmental information, such as weather, geography, interference, event (e.g., sports event, etc.), base station status, and the like. Such environmental information may be obtained by any means, such as via the particular base station, sensors, network elements, traffic data, user information (patterns), performance metrics, and the like.

As such, according to example embodiments, the base station parameter adjustments (i.e., edge level configuration management) may be performed based on the predicted network failure, in order to reduce the impact of the failure.

The cluster level configuration management at the cluster layer 320 may include an operation associated with a management of a configuration underlying a group (cluster) of base stations (i.e., cluster level). For example, one second agent deployed at data center 250 in FIG. 2 may perform an operation associated with a management of a configuration underlying base stations 212, 214, 216 within cluster 210, while another second agent deployed at data center 250 in FIG. 2 may perform an operation associated with a management of a configuration underlying base stations 222, 224 in cluster 220.

According to example embodiments, the operation associated with a management of a configuration underlying a group of base stations (i.e., cluster level configuration management) may include at least one of: load balancing and network slice management. The load balancing may include balancing of load between a plurality of based stations within a group/cluster, while the network slice management may include management (e.g., creation, deletion, etc.) of network slice across a plurality of based stations within a group/cluster. Further, the load balancing and network slice management (i.e., cluster level configuration management) may be performed based on a result of edge level configuration management in order to coordinate a plurality of based stations within a group/cluster to further reduce the impact of the network failure.

The global level configuration management at the global layer 330 may include an operation associated with a management of a configuration underlying all base stations within the network. For example, a third agent deployed at data center 250 in FIG. 2 may perform an operation associated with a management of a configuration underlying all base stations 212, 214, 216, 222, 224, 232, 234, 236, 242, 244, 246, 248 within the network 200.

According to example embodiments, the operation associated with a management of a configuration underlying all base stations (i.e., global level configuration management) may include network-wide resource management. The network-wide resource management may include management of resources across all base stations within the network. Further, the network-wide resource management (i.e., global level configuration management) may be performed based on a result of cluster level configuration management in order to coordinate all based stations across different clusters within a network to further reduce the impact of the network failure and ensure overall network stability.

It is noted that the edge level configuration management, cluster level configuration management, and global level configuration management may include any additional operations associated with management at different levels, such as those further described in relation to FIG. 3B below.

For example, in a scenario where a group of users are travelling on a train along a path through a plurality of base stations. The first agent may predict that the handover process may not be fast enough to be performed as the users are constantly moving at high speed via the train, causing connection drops between base stations. As such, the first agent, the second agent, and the third agent may perform the edge level configuration management, cluster level configuration management, and global level configuration management, respectively, such that resources are pre-allocated along the travel path and handover across multiple base stations can be coordinated and performed seamlessly, while adapting to train speed and passenger load.

Figure 3B:
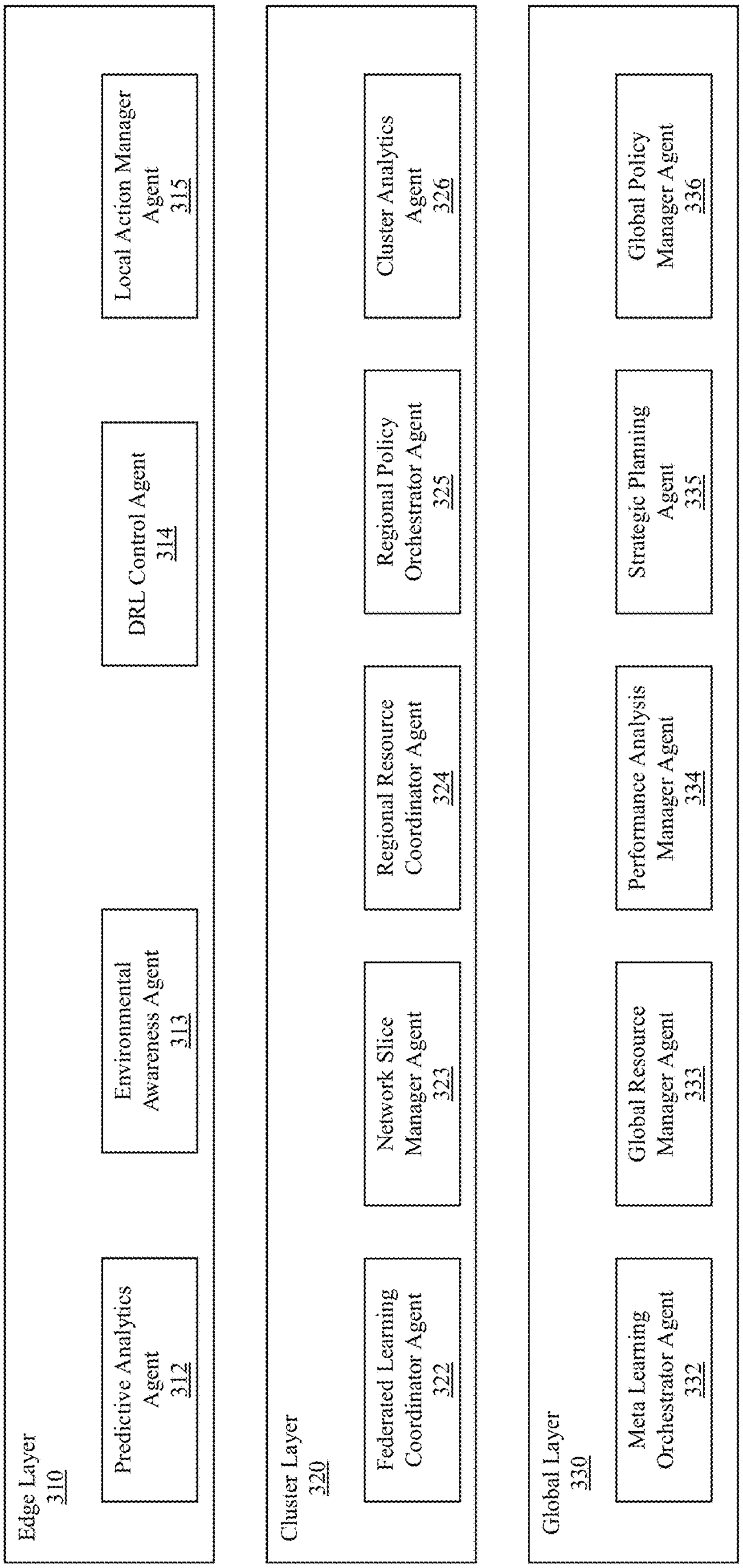

FIG. 3B illustrates an example layer configuration, according to one or more example embodiments. The example layer configuration shown in FIG. 3B may be similar to the example layer configuration shown in FIG. 3A, where each of the first agent 311, the second agent 321, and the third agent 331 corresponds to a plurality of agents.

In particular, as shown in FIG. 3B, the edge layer 310 may be associated with predictive analytics agent 312, environmental awareness agent 313, deep reinforcement learning (DRL) control agent 314, and local action manager agent 315 which may together be configured to perform configuration management at an edge level; the cluster layer 320 may be associated with federated learning coordinator agent 322, network slice manager agent 323, regional resource coordinator agent 324, regional policy orchestrator agent 325, and cluster analytics agent 326 which may together be configured to perform configuration management at a cluster level; and global layer 330 may be associated with meta learning orchestrator agent 332, global resource manager agent 333, performance analysis manager agent 334, strategic planning agent 335, and global policy manager agent 336 which may together be configured to perform configuration management at a global level.

It is understood that predictive analytics agent 312, environmental awareness agent 313, deep reinforcement learning (DRL) control agent 314, and local action manager agent 315 may together correspond to the first agent, where the below described operations, functions, inputs, outputs, and the like of these agents may be combined/integrated into the first agent (singular entity) to perform configuration management at an edge level. Similarly, federated learning coordinator agent 322, network slice manager agent 323, regional resource coordinator agent 324, regional policy orchestrator agent 325, and cluster analytics agent 326 may together correspond to the second agent, where the below described operations, functions, inputs, outputs, and the like of these agents may be combined/integrated into the second agent (singular entity) to perform configuration management at a cluster level. Further, meta learning orchestrator agent 332, global resource manager agent 333, performance analysis manager agent 334, strategic planning agent 335, and global policy manager agent 336 may together correspond to the third agent, where the below described operations, functions, inputs, outputs, and the like of these agents may be combined/integrated into the third agent (singular entity) to perform configuration management at a global level.

The predictive analytics agent 312 may be configured to perform operations associated with prediction of network failure of a particular base station. The network failure may include any kind of failure associated with a particular base station, such as high call drop rates, hardware/software malfunctions, and the like. As such, according to example embodiments, the operation associated with prediction of network failure may include real-time data analysis, failure/anomalies prediction, performance monitoring, anomaly detection, and the like. Further, the network failure may be predicted based on any kind of inputs obtained via a particular base station, such as hardware data (e.g., CPU performance, memory capacity, hardware temperature, etc.), network key performance indicators (KPIs) (e.g., reference signal received power (RSRP), signal to interference plus noise ratio (SINR), throughput, etc.), error rates and logs, historical data, traffic patterns, and the like. According to example embodiments, the network failure may also be predicted based on results (output) of environmental awareness agent 313.

The environmental awareness agent 313 may be configured to perform operations associated with monitoring of environmental information of a particular base station. The environmental information may include any kind of information associated with an environment of a particular base station, such as weather, geography, interference, event (e.g., sports event, etc.), base station status, and the like. As such, according to example embodiments, the operations associated with monitoring of environmental information of a particular base station may include network context monitoring, environmental impact assessment, sensor data processing, weather condition analysis, news analysis, events analysis, interference detection and measurements, and the like. Further, the environmental information may be monitored based on any kind of inputs obtained via a particular base station, such as environment news forecasts, weather sensors, interference sensor, location data, physical environment data, signal propagation data, and the like.

The deep reinforcement learning (DRL) control agent 314 may be configured to perform operations associated with determination of base station parameter adjustment. The base station parameter adjustments may include adjustments of parameters of a particular base station. The parameters of a particular base station may include any kind of parameters associated with a particular base station, such as antenna tilt, antenna array configuration, antenna power, and the like. As such, according to example embodiments, the operations associated with determination of base station parameter adjustment may include execution of Deep Q-Network (DQN) algorithm, state/action space management, local decision making, immediate reward process, local parameter optimization, resource allocation, action recommendation, and the like. According to example embodiments, the network failure may also be predicted based on at least one of: results (output) of predictive analytics agent 312 (e.g., metrics, KPIs, etc.), results (output) of environmental awareness agent 313 (e.g., context data, etc.), and local (particular base station) performance measurements.

Here, it is noted that the DQN algorithm may include one or more of: Standard DQN, Double DQN, and Dueling DQN. The Standard DQN may refer to an algorithm that utilizes a neural network to approximate a Q-value function. Such algorithm may introduce experience replay and target network stability. The Double DQN may improve upon the Standard DQN by reducing overestimation of Q-value. The Dueling DQN may improve upon the Standard DQN by separating the Q-value function and advantage function for better learning.

The local action manager agent 315 may be configured to perform operations associated with execution of base station parameter adjustment. As such, according to example embodiments, the operations associated with execution of base station parameter adjustment may include action validation and prioritization, action execution control, local resource management, execution feedback provision, and the like. According to example embodiments, the base station parameter adjustment may also be executed based on at least one of: results (output) of predictive analytics agent 312 (e.g., predicted failure, risk assessment, failure probabilities, system status, etc.), results (output) of environmental awareness agent 313 (e.g., environmental conditions, context information, external constraints, weather impacts, etc.), results (output) of DRL control agent 314 (e.g., proposed action, action priorities, target parameters, optimization goals, etc.), and base station information (e.g., current parameters, hardware status, resource availability, execution capabilities, etc.)

In this regard, the result (output) of the local action manager agent 315 may be provided to a particular base station (i.e., the base station which the local action manager agent 315 is deployed at) to execute base station parameter adjustment, which may include, for example, action validation, command execution, parameter update, resource allocation, and the like. The result (output) of the local action manager agent 315 may also be provided to the DRL control agent 314 to provide feedback, which may include, for example, action execution status, success/failure feedback, resource availability, execution constraints, and the like. Similarly, the result (output) of the local action manager agent 315 may also be provided to other agents in the edge layer 310 to provide feedback, which may include, for example, action completion notification, resource status updates, execution metrics, performance impact, and the like.

Further, the result (output) of one or more agents in the edge layer 310 may be provided to one or more agents in the cluster layer 320 in order to provide edge level information and facilitate decision making for the agents in the cluster layer 320, which may include, for example, action summaries, resource utilization, performance impacts, execution statistics, and the like.

In this regard, according to example embodiments, one or more agents in the edge layer 310 may be trained based on reinforcement learning (RL) method. The implementation of RL may include primary algorithm, state space, action space, and reward function. The primary algorithm may include algorithms such as Deep Q-Network (DQN) algorithm. The state space may refer to possible network conditions, and may include signal quality metrics (e.g., RSRP, SINR, throughput, etc.), resource utilization (e.g., CPU, memory, bandwidth, etc.), traffic patterns and user distributions, environmental conditions, performance predictions, load status, and the like. The action space may refer to possible agent actions, and may include power adjustments (e.g., −β dB to +3 dB steps), antenna tilt modifications (e.g., $-5^\circ$ to $+5^\circ$ steps), resource allocation decisions, load balancing triggers, slice resource adjustments, and the like. The reward function may refer to measurement of action success, and may include the following equation as an example, $$R = w_1(CS) + w_2(TS) + w_3(LB) - w_4(PC)$$

The R may represent the reward score, CS may represent the coverage score, TS may represent the throughput score, LB may represent the load balance, PC may represent the power cost, and $w_1$, $w_2$, $w_3$, and $w_4$ may represent different weights.

Further, according to example embodiments, agents in the edge layer 310 may communicate and exchange information with each other. The information exchanged between the agents in the edge layer 310 may include information associated with state sharing, action coordination, feedback mechanism, response synchronization, and learning coordination.

The state sharing may include information such as real-time KPI synchronization, environmental context distribution, resource utilization status, performance metric aggregation, prediction state updates, traffic pattern sharing, and the like. The action coordination may include information such as action validation and verification, conflict detection and resolution, priority-based execution scheduling, resource allocation synchronization, load balancing coordination, parameter adjustment alignment, and the like. The feedback mechanism may include information such as action execution status, performance impact measurements, resource utilization tracking, quality of service (QoS)/quality of experience (QoE) monitoring, failure detection alerts, learning effectiveness metrics, and the like. The response synchronization may include information such as real-time state updates, critical alert propagation, decision outcome sharing, resource status broadcasting, context change notification, performance feedback loops, and the like. The learning coordination may include information such as experience sharing, model update synchronization, policy adaptation alignment, reward signal distribution, training data synchronization, learning rate adjustments, and the like.

The federated learning coordinator agent 322 may be configured to perform operations associated with coordination of federated learning. As such, according to example embodiments, the operations associated with coordination of federated learning may include model aggregation and parameter averaging, knowledge sharing between agents within the cluster layer, training coordination and synchronization, model update distribution, performance monitoring and management of distributed learning, and the like. Further, the federated learning may be coordinated based on model updates received from one or more agents within the edge layer, training metrics and performance data, model validation results, learning convergence metrics, resource utilization statistics, and the like.

In this regard, the results (output) of federated learning coordinator agent 322 may include updated global models provided to one or more agents within the edge layer, training directives and parameters, model performance feedback, learning rate adjustments, optimization suggestions, and the like.

According to example embodiments, the federated learning coordinator agent 322 may be configured with an RL support role to perform operations associated with distributed learning coordination, local policies aggregation, learning parameters synchronization, experience sharing management, and the like. According to example embodiments, the federated learning coordinator agent 322 may also be configured with learning coordination role to perform operations associated with policy averaging, gradient aggregation, experience replay management, learning rate adaptation, and the like.

The network slice manager agent 323 may be configured to perform operations associated with management of network slice. According to example embodiments, the operations associated with management of network slice may include dynamic slice creation and deletion (network slice management), resource isolation and allocation, QoS/QoE monitoring and management, slice lifecycle management, slice performance optimization, and the like. Further, the network slice may be managed based on service requirements and service level agreements (SLAs), resource availability data, user demand patterns, QoS measurements, performance metrics obtained from one or more agents within the edge layer, slice utilization statistics, and the like.

In this regard, the results (output) of network slice manager agent 323 may include slice configurations provided to one or more agents within the edge layer, resource allocation decisions, QoS enforcement policies, performance optimization directives, capacity planning recommendations, and the like.

According to example embodiments, the network slice manager agent 323 may be configured with an RL support role to perform operations associated with DQN for slice optimization, state information management related to slice performance, slice specific rewards provision, slice-related action execution from the regional resource coordinator agent 324, and the like. According to example embodiments, the network slice manager agent 323 may also be configured with a state contribution role to perform operations associated with slice performance metrics, resource utilization per slice, QoS measurements, service demand patterns, and the like.

The regional resource coordinator agent 324 may be configured to perform operations associated with coordination of regional (cluster) resource. According to example embodiments, the operations associated with coordination of regional (cluster) resource may include regional load balancing, inter-cell (base station) resource coordination, interference management, regional performance optimization, capacity planning, and the like. Further, the regional resource may be coordinated based on cell-load information, resource utilization metrics, interference measurements, user distribution data, traffic patterns, service demand statistics, edge agent performance data, and the like.

In this regard, the results (output) of regional resource coordinator agent 324 may include load balancing directives, resource allocation policies, interference mitigation strategies, optimization commands provided to agents within the cluster layer, capacity adjustment recommendations, and the like.

The regional policy orchestrator agent 325 may be configured to perform operations associated with orchestration of regional (cluster) policy. According to example embodiments, the operations associated with orchestration of regional (cluster) policy may include regional policy management, policy conflict resolution, policy compliance, policy update coordination, policy optimization, performance monitoring, cross-cell coordination, and the like. Further, the regional (cluster) policy may be orchestrated based on global policies received from one or more agents within the global layer, local policy effectiveness metrics, performance KPIs, resource utilization data, service quality metrics, compliance requirements, and the like.

In this regard, the results (output) of regional policy orchestrator agent 325 may include optimized local policies, policy update directives, coordination guidelines, performance targets, compliance reports, and the like.

The cluster analytics agent 326 may be configured to perform operations associated with analysis of a cluster. According to example embodiments, the operations associated with analysis of a cluster may include regional performance analysis, trend identification, anomaly detection at cluster level, predictive analytics for cluster, resource optimization analysis, insights provision, and the like. Further, the cluster may be analyzed based on performance metrics received from one or more agents within the edge layer, resource utilization data, service quality metrics, historical performance data, user behavior patterns, environmental data, and the like.

In this regard, the results (output) of cluster analytics agent 326 may include performance insights, trend analysis reports, optimization recommendations, predictive alerts, resource efficiency suggestions, and the like.

According to example embodiments, the cluster analytics agent 326 may be configured with an RL support role to perform operations associated with enhanced state information provision, derived features for RL generation, action outcome validations, reward calculation contributions, and the like. According to example embodiments, the cluster analytics agent 326 may also be configured with an analytics support role to perform operations associated with feature extraction, pattern recognition, performance prediction, impact analysis, and the like.

In this regard, according to example embodiments, one or more agents in the cluster layer 320 may be trained based on reinforcement learning (RL) method. The implementation of RL may include primary algorithm, state space, action space, reward function, and learning process. The primary algorithm may include algorithms such as Advantage Actor-Critic (A3C) algorithm, where the purpose of such algorithm is to optimize regional (cluster) resource allocation and coordination. The state space may refer to possible network conditions, and may include cluster-wide resource utilization, load distribution across base stations, inter-cell (base station) interference levels, service quality metrics, regional traffic patterns, and the like. The action space may refer to possible agent actions, and may include resource distribution commands, load balancing adjustments, interference mitigation parameters, capacity allocation decisions, service priority adjustments, and the like. The reward function may refer to measurement of action success, and may include the following equation as an example, $$R = w_5(RQoS) + w_6(CRE) + w_7(SQ) - w_8(In)$$

The R may represent the reward score, RQoS may represent the regional quality of service and performance, CRE may represent the cluster resource efficiency and utilization, SQ may represent the service quality and service level objectives, In may represent the interference, and $w_5$, $w_6$, $w_7$, and $w_8$ may represent different weights. The learning process may include parallel advantage estimation, asynchronous gradient updates, policy and value function optimization, experience sharing across cluster, and the like.

Further, according to example embodiments, agents in the cluster layer 320 may communicate and exchange information with each other. The information exchanged between the agents in the cluster layer 320 may include information associated with state sharing, action coordination, and reward distribution.

The state sharing may include information such as synchronized state observations, feature sharing, context distribution, performance metrics, and the like. The action coordination may include information such as action validation, conflict resolution, priority management, impact assessment, and the like. The reward distribution may include information such as reward decomposition, credit assignment, impact attribution, performance feedback, and the like.

The meta learning orchestrator agent 332 may be configured to perform operations associated with orchestration of meta learning. According to example embodiments, the operations associated with orchestration of meta learning may include cross-domain knowledge transfer, global policy optimization, learning strategy adaptation, network-wide learning coordination, and the like. Further, the meta learning may be orchestrated based on cluster level performance data, resource utilization metrics, learning effectiveness metrics, service quality indicators, system health data, and the like.

In this regard, the results (output) of meta learning orchestrator agent 332 may include optimized global policies, learning parameter updates, resource allocation strategies, performance optimization directives, and the like.

The global resource manager agent 333 may be configured to perform operations associated with management of global resource. According to example embodiments, the operations associated with management of global resource may include network-wide resource optimization and management, global capacity planning, strategic resource allocation, cross-region coordination, and the like. Further, the global resource may be managed based on resource utilization metrics, demand forecasts, performance requirements, capacity constraints, cost metrics, and the like.

In this regard, the results (output) of global resource manager agent 333 may include resource allocation policies, capacity planning directives, optimization strategies, cost optimization plans, and the like.

The performance analysis manager agent 334 may be configured to perform operations associated with analysis of performance at the global level. According to example embodiments, the operations associated with analysis of performance at the global level may include global KPI monitoring and analysis, trend analysis, system-wide optimization and performance monitoring, strategic performance planning, and the like. Further, the performance at the global level may be analyzed based on network-wide KPIs, historical performance data, service quality metrics, user satisfaction data, cost metrics, and the like.

In this regard, the results (output) of analysis manager agent 334 may include performance insights, optimization recommendations, strategic planning inputs, trend analysis reports, and the like.

The strategic planning agent 335 may be configured to perform operations associated with planning of strategy. According to example embodiments, operations associated with planning of strategy may include long-term strategy development and optimization, network evolution planning, service deployment strategy, cost optimization, future capacity planning, and the like. Further, the strategy may be planned based on business objectives, technology trends, market demands, resource constraints, performance forecasts, and the like.

In this regard, the results (output) of strategic planning agent 335 may include strategic plans, evolution roadmaps, deployment strategies, investment recommendations, and the like.

The global policy manager agent 336 may be configured to perform operations associated with management of global policy. According to example embodiments, the operations associated with management of global policy may include global policy harmonization and management, compliance management, policy optimization, cross-domain coordination, and the like. Further, the global policy may be managed based on regulatory requirements, service policies, performance policies, security policies, business rules, and the like.

In this regard, the results (output) of global policy manager agent 336 may include harmonized policies, compliance frameworks, policy updates, governance guidelines, and the like.

According to example embodiments, one or more agents in the global layer 330 may be trained based on reinforcement learning (RL) method. The implementation of RL may include primary algorithm, state space, action space, and reward function. The primary algorithm may include algorithms such as Proximal Policy Optimization (PPO) algorithm. The state space may refer to possible network conditions, and may include network-wide performance metrics, resource utilization patterns, service quality indicators, system health metrics, learning effectiveness measures, and the like. The action space may refer to possible agent actions, and may include policy update directives, learning rate adjustments, resource allocation strategies, service priority modifications, training parameter tunings, and the like.

The reward function may refer to measurement of action success, and may include the following equation as an example, $$R = w_9(NQoS) + w_{10}(NRE) + w_{11}(SQ) - w_{12}(OC)$$

The R may represent the reward score, NQoS may represent the overall network quality of service and performance, NRE may represent the network resource efficiency and utilization, SQ may represent the service quality and service level objectives, OC may represent the operational costs (i.e., resource and energy costs), and $w_9$, $w_{10}$, $w_{11}$, and $w_{12}$ may represent different weights.

Further, according to example embodiments, agents in the global layer 330 may communicate and exchange information with each other. The information exchanged between the agents in the global layer 330 may include information associated with state sharing, action coordination, and feedback mechanism.

The state sharing may include information such as global state synchronization, performance metric sharing, resource status updates, policy effectiveness metrics, and the like. The action coordination may include information such as strategic alignment, policy harmonization, resource optimization, performance optimization, and the like. The feedback mechanism may include information such as performance monitoring, policy effectiveness, resource utilization, service quality, and the like.

Example Operations for Performing Network Failure Prevention and Recovery in the Present Disclosure In the following, several example operations are performable by the system of one or more example embodiments of the present disclosure are described with reference to FIG. 4.

Figure 4:
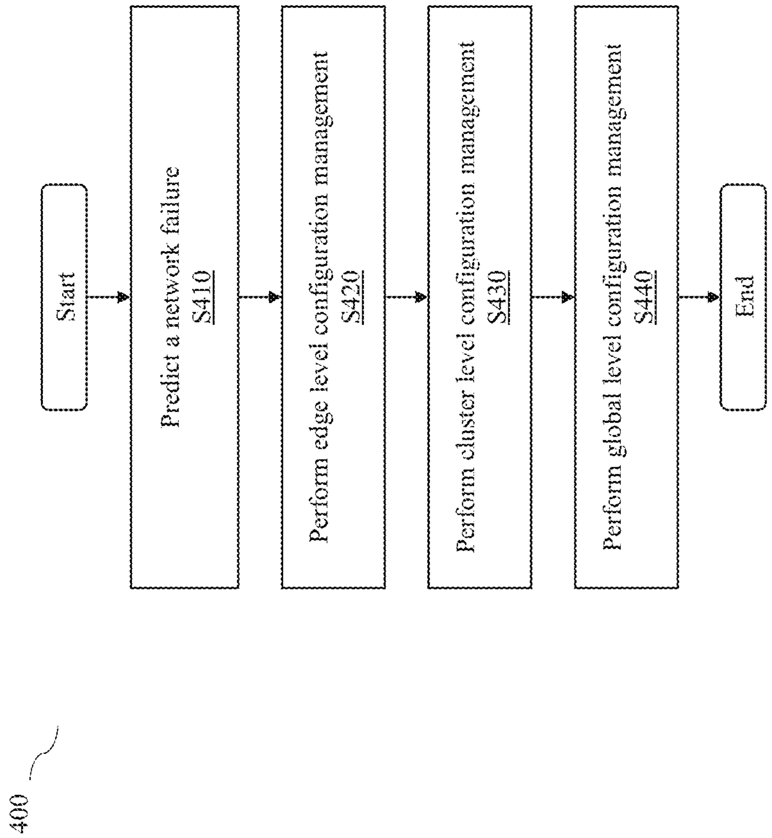
FIG. 4 illustrates a flow diagram of an example method for performing network failure prevention and recovery, according to one or more example embodiments.

FIG. 4 illustrates a flow diagram of an example method 400 for performing network failure prevention and recovery, according to one or more example embodiments. One or more operations in method 400 may be performed by the system of one or more example embodiments of the present disclosure. The system may be configured to perform network failure prevention and recovery.

According to example embodiments, the system may include the first agent, the second agent, and the third agent described above in relation to FIG. 2, FIG. 3A, and FIG. 3B, where the first agent, the second agent, and the third agent may be communicatively coupled to each other.

As illustrated in FIG. 4, at operation S410, the system may be configured to predict a network failure. The network failure may be predicted by a first agent.

Here, the first agent may include a software entity deployed at a base station. According to example embodiments, the first agent may include an artificial intelligence (AI) entity trained based on deep reinforcement learning (DRL). According to example embodiments, the first agent may include a plurality of first agents communicatively coupled to each other, where the plurality of first agents may include predictive analytics agent, environmental awareness agent, deep reinforcement learning (DRL) control agent, and local action manager agent.

The network failure may include any kind of failure associated with a particular base station (i.e., the base station which the first agent is deployed at) such as high call drop rates, hardware/software malfunctions, and the like. Further, the network failure may be predicted based on environmental information, such as weather, geography, interference, event (e.g., sports event, etc.), base station status, and the like obtained via the particular base station (e.g., sensors, etc.)

For example (first example), a first agent deployed at a base station may predict that the base station will fail (i.e., cell degradation; network failure) based on power fluctuation and increasing error rates at the base station (i.e., environmental information).

In a second example, a first agent deployed at a base station may predict that the base station will experience high interference and signal degradation (i.e., network failure) based on weather sensor detecting incoming heavy rain (i.e., environmental information).

In a third example, a first agent deployed at a base station may predict that the base station will experience high spike in traffic leading to poor performance at the base station (i.e., network failure) based on sports event schedule, crowd movements, and the like (i.e., environmental information). The method then proceeds to operation S420.

At operation S420, the system may be configured to perform edge level configuration management for a base station. The edge level configuration management for a base station may be performed by the first agent (i.e., deployed at such base station) based on the predicted network failure.

The edge level configuration management may include an operation associated with a management of a configuration of individual base station (i.e., edge level). According to example embodiments, the operation associated with a management of a configuration of individual base station (i.e., edge level configuration management) may include base station parameter adjustment. The base station parameter adjustments may include adjustments of parameters of a particular base station. The parameters of a particular base station may include any kind of parameters associated with a particular base station, such as antenna tilt, antenna array configuration, antenna power, and the like. As such, according to example embodiments, the base station parameter adjustments (i.e., edge level configuration management) may be performed based on the predicted network failure, in order to reduce the impact of the failure.

For example, in the first example, the first agent may adjust parameters associated with the power of the base station to reduce power in response to the prediction that the base station will fail due to power fluctuation and error rates.

In the second example, the first agent may adjust parameters associated with the antenna tilt of the base station in response to the prediction that the base station will experience high interference and signal degradation due to heavy rain.

In the third example, the first agent may adjust parameters associated with the power of the base station to increase power in response to the prediction that the base station will experience high spike in traffic leading to poor performance at the base station due to events. The method then proceeds to operation S430.

At operation S430, the system may be configured to perform cluster level configuration management for a group of base stations. The cluster level configuration management for a group of base stations may be performed by a second agent based on a result of edge level configuration management.

Here, the second agent may include a software entity deployed at a data center. According to example embodiments, the second agent may include an artificial intelligence (AI) entity trained based on federated learning. According to example embodiments, the second agent may include a plurality of second agents communicatively coupled to each other, where the plurality of second agents may include federated learning coordinator agent, network slice manager agent, regional resource coordinator agent, regional policy orchestrator agent, and cluster analytics agent. Further, the group of base stations may include the base station associated with the predicted network failure and edge level configuration management in operations S410 and S420.

The cluster level configuration management may include an operation associated with a management of a configuration underlying a group (cluster) of base stations (i.e., cluster level). According to example embodiments, the operation associated with a management of a configuration underlying a group of base stations (i.e., cluster level configuration management) may include at least one of: load balancing and network slice management. The load balancing may include balancing of load across a plurality of based stations within a group/cluster, while the network slice management may include management (creation, deletion, and the like) of network slice across a plurality of based stations within a group/cluster. Further, the load balancing and network slice management (i.e., cluster level configuration management) may be performed based on a result of edge level configuration management in order to coordinate a plurality of based stations within a group/cluster to further reduce the impact of the network failure.

For example, in the first example, based on the first agent adjusting parameters associated with the power of the base station to reduce power in response to the prediction that the base station will fail due to power fluctuation and error rates, the second agent may perform load balancing to reduce load at the subject base station and to increase load at other base stations within the same group/cluster as the subject base station, in order to compensate for the reduced load and power at the base station.

In the second example, based on the first agent adjusting parameters associated with the antenna tilt of the base station in response to the prediction that the base station will experience high interference and signal degradation due to heavy rain, the second agent may perform network slice management to allocate network slice for priority services, in order to mitigate rain impact.

In the third example, based on the first agent adjusting parameters associated with the power of the base station to increase power in response to the prediction that the base station will experience high spike in traffic leading to poor performance at the base station due to events, the second agent may perform network slice management to allocate network slice for different services (steaming, calls, emergency services, etc.), in order to mitigate traffic spike impact. The method then proceeds to operation S440.

At operation S440, the system may be configured to perform global level configuration management for all base stations within a network. The global level configuration management for all base stations within a network may be performed by a third agent based on a result of cluster level configuration management.

Here, the third agent may include a software entity deployed at a data center. According to example embodiments, the second agent may include an artificial intelligence (AI) entity trained based on meta learning. According to example embodiments, the third agent may include a plurality of third agents communicatively coupled to each other, where the plurality of third agents may include meta learning orchestrator agent, global resource manager agent, performance analysis manager agent, strategic planning agent, and global policy manager agent. Further, all base stations within the network may include the group of base stations associated with the cluster level configuration management in operation S430, as well as the base station associated with the predicted network failure and edge level configuration management in operations S410 and S420.

The global level configuration management may include an operation associated with a management of a configuration underlying all base stations within the network. According to example embodiments, the operation associated with a management of a configuration underlying all base stations (i.e., global level configuration management) may include network-wide resource management. The network-wide resource management may include management of resources across all base stations within the network. Further, the network-wide resource management (i.e., global level configuration management) may be performed based on a result of cluster level configuration management in order to coordinate all based stations across different clusters within a network to further reduce the impact of the network failure and ensure overall network stability.

For example, in the first example, based on the second agent performing load balancing to reduce load at the subject base station and to increase load at other base stations within the same group/cluster as the subject base station, the third agent may perform network-wide resource management to increase resource allocated to the subject group/cluster of base stations, in order to compensate for the increase in load at the base stations in the subject group/cluster of base stations.

In the second example, based on the second agent performing network slice management to allocate network slice for priority services, the third agent may perform network-wide resource management to increase resource allocated to the subject group/cluster of base stations, in order to compensate for the increase in the network slice at the subject group/cluster of base stations.

In the third example, based on the second agent performing network slice management to allocate network slice for different services (steaming, calls, emergency services, etc.), the third agent may perform network-wide resource management to increase resource allocated to the subject group/cluster of base stations, in order to compensate for the increase in the network slice at the subject group/cluster of base stations.

According to example embodiments, the above described edge level configuration management, cluster level configuration management, and global level configuration management may be performed prior to the predicted network failure occurring. According to example embodiments, the edge level configuration management, cluster level configuration management, and global level configuration management may be performed in order. According to example embodiments, the edge level configuration management, cluster level configuration management, and global level configuration management may be performed simultaneously.

Upon performing operation S440, the method 400 may be ended or be terminated. Alternatively, method 400 may return to operation S410, such that the at least one processor may be configured to repeatedly perform, for at least a predetermined amount of time, the predicting the network failure (at operation S410), the performing the edge level configuration management (at operation S420), the performing the cluster level configuration management (at operation S430), and the performing the global level configuration management (at operation S440).

For instance, the first agent may predict a new network failure. Accordingly, the system may return to operation S410, such that the at least one processor may be configured to repeatedly perform, for at least a predetermined amount of time, the predicting the (new) network failure (at operation S410), the performing the edge level configuration management (at operation S420), the performing the cluster level configuration management (at operation S430), and the performing the global level configuration management (at operation S440).

Accordingly, the above processes allow for reduction of impacts from network failure through preemptive coordinated response from agents at different levels within the network, and thereby preventing service interruptions and maintaining high and seamless service quality in light of the network failure.

In particular, the above processes may improve overall network performance by providing fast response, efficient resource utilization and energy consumption, and ensuring high service availability in light of network failures. Further, the above processes may provide commercial advantages by reducing maintenance costs, lowering power consumption, and reducing service interruptions. Furthermore, the above processes may provide operational benefits, such as automated management, predictive maintenance, simplified deployment, and high service quality.

In addition, example embodiments of the present disclosure may be adapted for various scenarios beyond network planning and optimization. The following descriptions provide some examples of such variations, but the present disclosure should not be limited thereto.

In an integrated access backhaul (IAB) network, both access and backhaul links may share the same wireless spectrum, necessitating efficient routing to optimize performance. Here, example embodiments of the present disclosure where each agent represents a base station may be implemented. These agents may collaboratively learn optimal routing policies to enhance packet arrival ratios and minimize latency, thereby enhancing data routing efficiency in dense urban environments with limited fiber infrastructure.

In an internet of things (IoT) network with edge computing, IoT devices may often require offloading of computation to edge servers, demanding efficient resource allocation to balance energy consumption and latency. Here, example embodiments of the present disclosure may be implemented where each IoT device acts as an agent, learning to make decisions on computation offloading, transmit power levels, and radio access technology selection. This approach minimizes system costs and optimizes resource utilization, thereby improving performance in smart city applications, such as real-time traffic monitoring and management.

In an autonomous vehicle coordination environment, autonomous vehicles may need to coordinate with each other to navigate safely and efficiently, especially in varying traffic conditions. Here, example embodiments of the present disclosure may be implemented with an attentional policy architecture, allowing each vehicle (agent) to focus on relevant information from other vehicles. This enables effective decision-making in environments with a varying number of agents, thereby enhancing traffic flow and reducing accidents in urban areas with mixed autonomous and human-driven vehicles.

In future internet and next-generation networks, emerging network technologies may involve heterogeneous and decentralized structures, requiring adaptive management strategies. Here, example embodiments of the present disclosure may be implemented to manage various aspects of network operations, including access control, power management, computation offloading, and security measures. Agents may be configured to learn optimal policies through interactions within the network environment, thereby facilitating seamless integration and management of diverse network technologies in next-generation internet infrastructures.

In network management with autonomous driving networks (ADN), as networks become more complex, there may be a growing need for automated management to handle tasks like traffic engineering and security. Here, example embodiments of the present disclosure may be implemented where agents may communicate and collaborate with each other to manage network resources efficiently, addressing challenges such as non-stationarity and promoting cooperation, thereby enabling automating network management in large-scale data centers or service provider networks to improve reliability and performance.

Various Aspects of Embodiments

In view of the above, example embodiments of the present disclosure allow for reduction of impacts from network failure through preemptive coordinated response from agents at different levels within the network, and thereby preventing service interruptions and maintaining high and seamless service quality in light of the network failure.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s) module, segment, or portion of instructions, which comprises one or more executable instructions for implementing the specified logical function (s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

One or more components of the system of the example embodiments, as well as the operations associated therewith (e.g., one or more operations in FIG. 4, etc.), may be implemented in one or more systems, devices, or hardware components, such as one or more servers, and the like. In the following, descriptions of a device in which the systems or components of the example embodiments may be implemented are provided. It is contemplated that one or more operations or methods described above with reference to FIG. 1 to FIG. 4 may be performed by the device. For instance, the one or more operations or methods may be performed by at least one processor of the device/system upon executing machine-readable instructions or computer-readable instructions stored in a memory or a storage component of the device.

Figure 5:
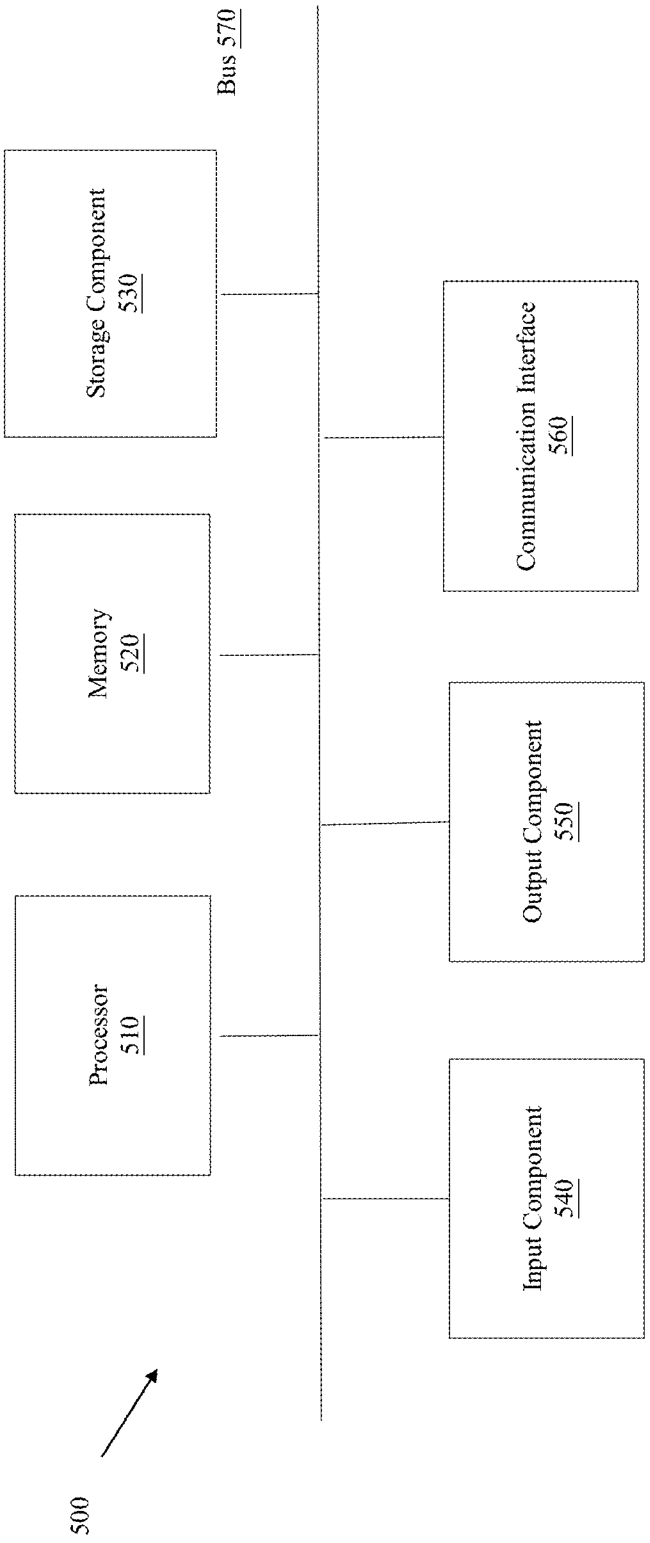
FIG. 5 illustrates an embodiment of a system for implementing one or more example embodiments.

FIG. 5 illustrates an embodiment of a device 500 for implementing one or more example embodiments. As shown in FIG. 5, the device 500 includes a processor 510, a memory 520, a storage component 530, an input component 540, an output component 550, a communication interface 560, and a bus 570.

The processor 510, as used herein, means any type of computational circuit that may comprise hardware elements and software elements. The processor 510 may be embodied as a multi-core processor, a single core processor, or a combination of one or more multi-core processors and one or more single core processors, a distributed processing system, or the like. The processor 510 may be a Central Processing Unit (CPU), a graphics processing unit (GPU), an accelerated processing unit (APU), an application-specific integrated circuit (ASIC), or another type of processing component.

Memory 520 includes a non-transitory computer readable medium. Memory 520 includes a random-access memory (RAM), a read only memory (ROM), and/or another type of dynamic or static storage device (e.g., a flash memory, a magnetic memory, and/or an optical memory) that stores information and/or instructions for use by processor 510. The memory 520 comprises machine-readable instructions which are executable by the processor 510. These machine-readable instructions when executed by the processor 510 causes the processor 510 to perform one or more method steps of an embodiment described herein.

Storage component 530 stores information and/or software related to the operation and use of the device 500. For example, storage component 530 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 540 is configured to receive information, such as user input. For example, the input component 540 may include, but not be limited to, a touch screen display, a keyboard, a keypad, a mouse, a button, a switch, and/or a microphone. Additionally, or alternatively, the input component 540 may include a sensor for sensing information (e.g., a global positioning system (GPS), an accelerometer, a gyroscope, and/or an actuator).

Output component 550 is configured to provide output information from the device 500. For example, the output component 550 may be, but not limited to, a display, a speaker, an instruction device to an external device, and/or one or more light-emitting diodes (LEDs).

Communication interface 560 is an interface that provides a communication connection to other devices, such as external devices and internal devices. The connection by the communication interface 560 can be a wired connection, a wireless connection, or a combination of wired and wireless connections, and can be a direct connection or an indirect connection via a communication network that exists between the device 500 and other devices. In other words, the standard of the communication interface 560 is not limited.

The bus 570 acts as an interconnect between the processor 510, the memory 520, the storage component 530, the input component 540, the output component 550, and the communication interface 560 of the device 500. The bus 570 may include a wired interconnection or a wireless interconnection.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500. Further, one or more method steps described in any of the embodiments may be performed utilizing a plurality of device 500 in communication with one another.

Further, according to example embodiments, the device 500 may include one or more elements from the system architecture described above in relation to FIG. 1. For example, the device 500 may include the data center 110 and/or the base stations 120-1, 120-2.

In the present disclosure, specific tasks may be performed using AI/ML (Artificial Intelligence/Machine Learning) models. An AI/ML model is a model generated using one or more AI technologies, one or more ML algorithm or both, and generates output data based on input data. This output data is used to perform tasks. Tasks performed using AI/ML models include those generally referred to as intellectual tasks, such as classification, prediction, natural language processing, etc.

Although AI and ML are explained separately, ML is a technology included in AI. In ML, instead of being explicitly programmed for a specific task, systems can improve their performance over time by identifying patterns and making inferences from training data. Typically, the generation of ML models includes data collection, model training, and model inference. Data collection involves gathering and preprocessing data to be used for training and inference. Model training involves developing and validating models using the collected data. Model inference involves applying the trained models to new data to generate new output data and perform tasks.

Machine learning includes various types of learning methods such as supervised learning, unsupervised learning, reinforcement learning, semi-supervised learning, self-supervised learning, transductive learning, transfer learning, meta learning, and the like. These types of learning methods can be appropriately selected according to the embodiments. Unless otherwise specified, the application of types not mentioned in this description is not precluded. Additionally, the structure of ML models may vary depending on the embodiments and learning methods, and is not limited to the methods disclosed. Furthermore, ML includes deep learning, which uses models that include neural networks. Deep learning models may include, for example, deep neural networks (DNNs), convolutional neural networks (CNNs), etc.

It should be noted that the AI/ML models presented hereinafter are examples and are not limited to the illustrated AI/ML models. They can be modified or altered by using different AI or ML algorithms. The configuration of the neural network is not limited to the configuration disclosed in the present disclosure and can be modified.

Figure 6:
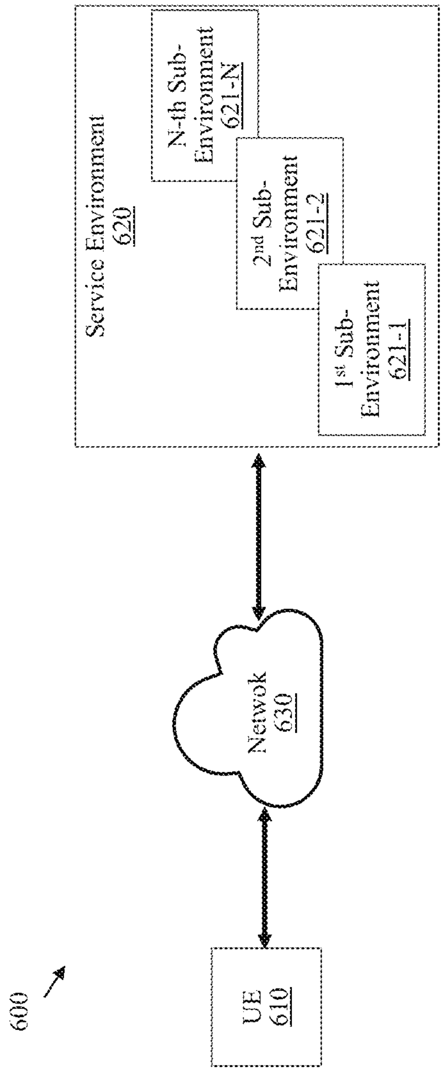
FIG. 6 is a diagram of an example of implementation environment in which systems and/or method, described herein, may be implemented.

FIG. 6 is a diagram of an example of implementation environment 600 in which systems and/or method, described herein, may be implemented. The implementation environment 600 includes a UE (User equipment) 610, a service environment 620, and a network 630. The service environment 620 include one or more sub-environments 621. To illustrate this, FIG. 6 shows, for convenience, examples of a 1st sub-environment 621-1, a 2nd sub-environment 621-2, and an N-th sub-environment 621-N (where N is any natural number).

The UE 610 is connected to the network 630, and the network 630 is connected to the service environment 620. The connections may be wired, wireless, or a combination of both wired and wireless. The UE 610 and the service environment 620 are connected via the network 630.

The UE 610 is a device that communicates with the service environment 620. The UE 610 receives information from the service environment 620 and/or sends information to the service environment 620. Also, the UE 610 may generate and/or store information to be transmitted, as necessary. Also, the UE 610 may store and/or process information that is received, as necessary.

The example FIG. 6 refers to the "UE". However, it should be understood by those skilled in the art that general terms such as "user device," "terminal," "terminal device," "communication device," and "communication terminal" can be used interchangeably with the term "UE."

For example, the UE 610 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device.

The service environment 620 is an environment that communicates with the UE 610 to provide one or more services. The service environment 620 receives information from the UE 610 and/or sends information to the UE 610. Also, the service environment 620 may generate and/or store information to be transmitted, as necessary. Also, the service environment 620 may store and/or process information that is received, as necessary. For example, the service environment 620 may provide computing resources as one of the services. It should be noted that the service is not limited to being provided to the UE; it may also be provided to devices other than the UE. For example, based on communication from the UE, the service may perform processes such as anomaly detection or traffic analysis and notify the results to a predetermined destination.

The example FIG. 6 refers to the "service environment". The term "service environment" is used to refer to the broader context within which services operate. For example, cloud environments, platforms, computing systems, network systems, and cloud systems generally represent the environments in which services are conducted, and these are included within the "service environment." However, the "service environment" is not limited to these examples. Additionally, the specific types of environments within the "service environment" are not restricted. For instance, cloud environments and cloud systems can be categorized as private cloud, public cloud, hybrid cloud, or multi-cloud, all of which are included within the "service environment."

The one or more services provided by the service environment 620 is not specifically limited and can be adjusted according to the embodiments. For example, the services may include a service that provides information to the UE 610, a service that stores information from the UE 610, or a service that performs processing based on information from the UE 610 and returns the results of the processing.

In an embodiment, the Service Environments 620 may also provide computing resources as the service. The computing resources can be hardware resources and/or software resources. For example, applications, processors, memory, and storage can be included in the provided computing resources. Each computing resource can communicate with other computing resources via wired connections, wireless connections, or a combination of wired and wireless connections.

The provided computing resources can be actual resources (also referred to as physical resources) and/or virtual resources. Furthermore, means of virtualization for virtual resources can be selected as appropriate. That is, in this disclosure, the use of adjectives such as "Virtual" or "Virtualized" to describe names does not imply that they are virtualized by a specific means of virtualization. For example, "virtual machine" refers to software that operates like an actual computer, realized through means of virtualization, and it is not intended to exclude those realized by specific means of virtualization such as Hypervisors or Containers. Conversely, when means of virtualization such as Hypervisors or containers are mentioned in this disclosure, it is merely cited as a general method of implementation. It should also be interpreted that embodiments implemented with other virtualization means are also disclosed. Also, the services may also be provided using resources virtualized by different means.

The service environment 620 includes one or more devices, such as servers and network devices, which provide services or perform processes. The placement of these devices within the service environment 620 can be determined as appropriate. Additionally, if the service environment 620 includes one or more sub-environments 621, the placement of devices can be determined based on predetermined policies for each sub-environment 621. For example, devices related to the first service may be placed in the 1st sub-environment 621-1, and devices related to the second service may be placed in the 2nd sub-environment 621-2. In another example, devices expected to have a higher load than a predetermined threshold may be placed in the 1st sub-environment 621-1, while devices expected to have a lower load than the predetermined threshold may be placed in the 2nd sub-environment 621-2. In this way, specific devices can be placed in specific sub-environments 621. Conversely, each sub-environment 621 can be specialized for a particular purpose.

In an embodiment, all processes executed in a single service may run within a single service environment, or in multiple service environments. Multiple processes executed in a single service could be provided by different service environments.

The network 630 is a network that exchanges information between the UE 610 and the service environment 620. The network 630 includes one or more wired and/or wireless networks.

For example, the network 630 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, a non-terrestrial network (NTN), and/or a combination of these or other types of networks.

The network 630 can be a part of a network. For example, in a 5G network that includes a RAN, a transport network, and a core network, the network 630 can be at least one of the RAN, the transport network, or the core network. For example, the service environment 620 could be in the core network, in which case the network 630 could correspond to a network that is a combination of a RAN and a transport network and is part of the 5G network.

The number and arrangement of devices and networks shown in FIG. 6 are provided as an example. It should be understood that any changes that may be implemented by those skilled in the art, such as the addition or rearrangement of well-known devices or networks at the time of implementation, are included in this disclosure.

Various further respective aspects and features of embodiments of the present disclosure may be defined by the following items:

Item [1]: A system that may be configured to: predict, by a first agent, a network failure; perform, by the first agent, edge level configuration management for a base station based on the predicted network failure; perform, by a second agent, cluster level configuration management for a group of base stations based on a result of edge level configuration management; and perform, by a third agent, global level configuration management for all base stations within a network based on a result of cluster level configuration management.

Item [2]: The system according to item [1], wherein the edge level configuration management may include an operation associated with a management of a configuration of individual base station, wherein the cluster level configuration management may include an operation associated with a management of a configuration underlying a group of base stations, and wherein the global level configuration management may include an operation associated with a management of a configuration underlying all base stations within a network.

Item [3]: The system according to one of items [1]-[2], wherein the edge level configuration management may include adjustment of parameters of the base station, wherein the cluster level configuration management may include at least one of: balancing of load across a plurality of base stations within the group of base stations and management of network slice across a plurality of base stations within the group of base stations, and wherein the global level configuration management may include management of resource across all base stations within the network.

Item [4]: The system according to one of items [1]-[3], wherein the first agent may include a plurality of first agents communicatively coupled to each other, and wherein the plurality of first agents may include predictive analytics agent, environmental awareness agent, deep reinforcement learning (DRL) control agent, and local action manager agent.

Item [5]: The system according to one of items [1]-[4], wherein the second agent may include a plurality of second agents communicatively coupled to each other, and wherein the plurality of second agents may include federated learning coordinator agent, network slice manager agent, regional resource coordinator agent, regional policy orchestrator agent, and cluster analytics agent.

Item [6]: The system according to one of items [1]-[5], wherein the third agent may include a plurality of third agents communicatively coupled to each other, and wherein the plurality of third agents may include meta learning orchestrator agent, global resource manager agent, performance analysis manager agent, strategic planning agent, and global policy manager agent.

Item [7]: The system according to one of items [1]-[6], wherein the first agent may include a software entity deployed at the base station, and wherein the second agent and the third agent may each include a software entity deployed at a datacenter.

Item [8]: The system according to one of items [1]-[7], wherein the first agent may include an artificial intelligence (AI) entity trained based on deep reinforcement learning (DRL), wherein the second agent may include an artificial intelligence (AI) entity trained based on federated learning, and wherein the third agent may include an artificial intelligence (AI) entity trained based on meta learning.

Item [9]: A method that may include: predicting, by a first agent, a network failure; performing, by the first agent, edge level configuration management for a base station based on the predicted network failure; performing, by a second agent, cluster level configuration management for a group of base stations based on a result of edge level configuration management; and performing, by a third agent, global level configuration management for all base stations within a network based on a result of cluster level configuration management.

Item [10]: The method according to item [9], wherein the edge level configuration management may include an operation associated with a management of a configuration of individual base station, wherein the cluster level configuration management may include an operation associated with a management of a configuration underlying a group of base stations, and wherein the global level configuration management may include an operation associated with a management of a configuration underlying all base stations within a network.

Item [11]: The method according to one of items [9]-[10], wherein the edge level configuration management may include adjustment of parameters of the base station, wherein the cluster level configuration management may include at least one of: balancing of load across a plurality of base stations within the group of base stations and management of network slice across a plurality of base stations within the group of base stations, and wherein the global level configuration management may include management of resource across all base stations within the network.

Item [12]: The method according to one of items [9]-[11], wherein the first agent may include a plurality of first agents communicatively coupled to each other, and wherein the plurality of first agents may include predictive analytics agent, environmental awareness agent, deep reinforcement learning (DRL) control agent, and local action manager agent.

Item [13]: The method according to one of items [9]-[12], wherein the second agent may include a plurality of second agents communicatively coupled to each other, and wherein the plurality of second agents may include federated learning coordinator agent, network slice manager agent, regional resource coordinator agent, regional policy orchestrator agent, and cluster analytics agent.

Item [14]: The method according to one of items [9]-[13], wherein the third agent may include a plurality of third agents communicatively coupled to each other, and wherein the plurality of third agents may include meta learning orchestrator agent, global resource manager agent, performance analysis manager agent, strategic planning agent, and global policy manager agent.

Item [15]: The method according to one of items [9]-[14], wherein the first agent may include a software entity deployed at the base station, and wherein the second agent and the third agent may each include a software entity deployed at a datacenter.

Item [16]: The method according to one of items [9]-[15], wherein the first agent may include an artificial intelligence (AI) entity trained based on deep reinforcement learning (DRL), wherein the second agent may include an artificial intelligence (AI) entity trained based on federated learning, and wherein the third agent may include an artificial intelligence (AI) entity trained based on meta learning.

Item [17]: A non-transitory computer-readable recording medium that may have recorded thereon instructions executable by a system to cause the system to perform a method including: predicting, by a first agent, a network failure; performing, by the first agent, edge level configuration management for a base station based on the predicted network failure; performing, by a second agent, cluster level configuration management for a group of base stations based on a result of edge level configuration management; and performing, by a third agent, global level configuration management for all base stations within a network based on a result of cluster level configuration management.

Item [18]: The non-transitory computer-readable recording medium according to item [17], wherein the edge level configuration management may include an operation associated with a management of a configuration of individual base station, wherein the cluster level configuration management may include an operation associated with a management of a configuration underlying a group of base stations, and wherein the global level configuration management may include an operation associated with a management of a configuration underlying all base stations within a network.

Item [19]: The non-transitory computer-readable recording medium according to one of items [17]-[18], wherein the edge level configuration management may include adjustment of parameters of the base station, wherein the cluster level configuration management may include at least one of: balancing of load across a plurality of base stations within the group of base stations and management of network slice across a plurality of base stations within the group of base stations, and wherein the global level configuration management may include management of resource across all base stations within the network.

Item [20]: The non-transitory computer-readable recording medium according to one of items [17]-[19], wherein the first agent may include a plurality of first agents communicatively coupled to each other, wherein the plurality of first agents may include predictive analytics agent, environmental awareness agent, deep reinforcement learning (DRL) control agent, and local action manager agent, wherein the second agent may include a plurality of second agents communicatively coupled to each other, wherein the plurality of second agents may include federated learning coordinator agent, network slice manager agent, regional resource coordinator agent, regional policy orchestrator agent, and cluster analytics agent, wherein the third agent may include a plurality of third agents communicatively coupled to each other, and wherein the plurality of third agents may include meta learning orchestrator agent, global resource manager agent, performance analysis manager agent, strategic planning agent, and global policy manager agent.

It is understood that numerous modifications and variations of the present disclosure are possible in light of the above teachings. It will be apparent that within the scope of the appended clauses, the present disclosures may be practiced otherwise than as specifically described herein.

What is claimed is:

1. A system configured to:

predict, by a first agent, a network failure;

perform, by the first agent, edge level configuration management for a base station based on the predicted network failure;

perform, by a second agent, cluster level configuration management for a group of base stations based on a result of edge level configuration management; and perform, by a third agent, global level configuration management for all base stations within a network based on a result of cluster level configuration management.

2. The system according to claim 1, wherein the edge level configuration management comprises an operation associated with a management of a configuration of individual base station, wherein the cluster level configuration management comprises an operation associated with a management of a configuration underlying a group of base stations, and wherein the global level configuration management comprises an operation associated with a management of a configuration underlying all base stations within a network.

3. The system according to claim 1, wherein the edge level configuration management comprises adjustment of parameters of the base station, wherein the cluster level configuration management comprises at least one of: balancing of load across a plurality of base stations within the group of base stations and management of network slice across a plurality of base stations within the group of base stations, and wherein the global level configuration management comprises management of resource across all base stations within the network.

4. The system according to claim 1, wherein the first agent comprises a plurality of first agents communicatively coupled to each other, and wherein the plurality of first agents comprise predictive analytics agent, environmental awareness agent, deep reinforcement learning (DRL) control agent, and local action manager agent.

5. The system according to claim 1, wherein the second agent comprises a plurality of second agents communicatively coupled to each other, and wherein the plurality of second agents comprise federated learning coordinator agent, network slice manager agent, regional resource coordinator agent, regional policy orchestrator agent, and cluster analytics agent.

6. The system according to claim 1, wherein the third agent comprises a plurality of third agents communicatively coupled to each other, and wherein the plurality of third agents comprise meta learning orchestrator agent, global resource manager agent, performance analysis manager agent, strategic planning agent, and global policy manager agent.

7. The system according to claim 1, wherein the first agent comprises a software entity deployed at the base station, and wherein the second agent and the third agent each comprises a software entity deployed at a datacenter.

8. The system according to claim 1, wherein the first agent comprises an artificial intelligence (AI) entity trained based on deep reinforcement learning (DRL), the second agent comprises an artificial intelligence (AI) entity trained based on federated learning, and the third agent comprises an artificial intelligence (AI) entity trained based on meta learning.

9. A method comprising:

predicting, by a first agent, a network failure;

performing, by the first agent, edge level configuration management for a base station based on the predicted network failure;

performing, by a second agent, cluster level configuration management for a group of base stations based on a result of edge level configuration management; and performing, by a third agent, global level configuration management for all base stations within a network based on a result of cluster level configuration management.

10. The method according to claim 9, wherein the edge level configuration management comprises an operation associated with a management of a configuration of individual base station, wherein the cluster level configuration management comprises an operation associated with a management of a configuration underlying a group of base stations, and wherein the global level configuration management comprises an operation associated with a management of a configuration underlying all base stations within a network.

11. The method according to claim 9, wherein the edge level configuration management comprises adjustment of parameters of the base station, wherein the cluster level configuration management comprises at least one of: balancing of load across a plurality of base stations within the group of base stations and management of network slice across a plurality of base stations within the group of base stations, and wherein the global level configuration management comprises management of resource across all base stations within the network.

12. The method according to claim 9, wherein the first agent comprises a plurality of first agents communicatively coupled to each other, and wherein the plurality of first agents comprise predictive analytics agent, environmental awareness agent, deep reinforcement learning (DRL) control agent, and local action manager agent.

13. The method according to claim 9, wherein the second agent comprises a plurality of second agents communicatively coupled to each other, and wherein the plurality of second agents comprise federated learning coordinator agent, network slice manager agent, regional resource coordinator agent, regional policy orchestrator agent, and cluster analytics agent.

14. The method according to claim 9, wherein the third agent comprises a plurality of third agents communicatively coupled to each other, and wherein the plurality of third agents comprise meta learning orchestrator agent, global resource manager agent, performance analysis manager agent, strategic planning agent, and global policy manager agent.

15. The method according to claim 9, wherein the first agent comprises a software entity deployed at the base station, and wherein the second agent and the third agent each comprises a software entity deployed at a datacenter.

16. The method according to claim 9, wherein the first agent comprises an artificial intelligence (AI) entity trained based on deep reinforcement learning (DRL), wherein the second agent comprises an artificial intelligence (AI) entity trained based on federated learning, and wherein the third agent comprises an artificial intelligence (AI) entity trained based on meta learning.

17. A non-transitory computer-readable recording medium having recorded thereon instructions executable by a system to cause the system to perform a method comprising:

predicting, by a first agent, a network failure;

performing, by the first agent, edge level configuration management for a base station based on the predicted network failure;

performing, by a second agent, cluster level configuration management for a group of base stations based on a result of edge level configuration management; and performing, by a third agent, global level configuration management for all base stations within a network based on a result of cluster level configuration management.

18. The non-transitory computer-readable recording medium according to claim 17, wherein the edge level configuration management comprises an operation associated with a management of a configuration of individual base station, wherein the cluster level configuration management comprises an operation associated with a management of a configuration underlying a group of base stations, and wherein the global level configuration management comprises an operation associated with a management of a configuration underlying all base stations within a network.

19. The non-transitory computer-readable recording medium according to claim 17, wherein the edge level configuration management comprises adjustment of parameters of the base station, wherein the cluster level configuration management comprises at least one of: balancing of load across a plurality of base stations within the group of base stations and management of network slice across a plurality of base stations within the group of base stations, and wherein the global level configuration management comprises management of resource across all base stations within the network.

20. The non-transitory computer-readable recording medium according to claim 17, wherein the first agent comprises a plurality of first agents communicatively coupled to each other, wherein the plurality of first agents comprise predictive analytics agent, environmental awareness agent, deep reinforcement learning (DRL) control agent, and local action manager agent, wherein the second agent comprises a plurality of second agents communicatively coupled to each other, wherein the plurality of second agents comprise federated learning coordinator agent, network slice manager agent, regional resource coordinator agent, regional policy orchestrator agent, and cluster analytics agent, wherein the third agent comprises a plurality of third agents communicatively coupled to each other, and wherein the plurality of third agents comprise meta learning orchestrator agent, global resource manager agent, performance analysis manager agent, strategic planning agent, and global policy manager agent.

* * * * *